(No Model.)
D. JARVES.
APPARATUS FOR MAKING AMMONIA.
No. 344,184. Patented June 22, 1886.
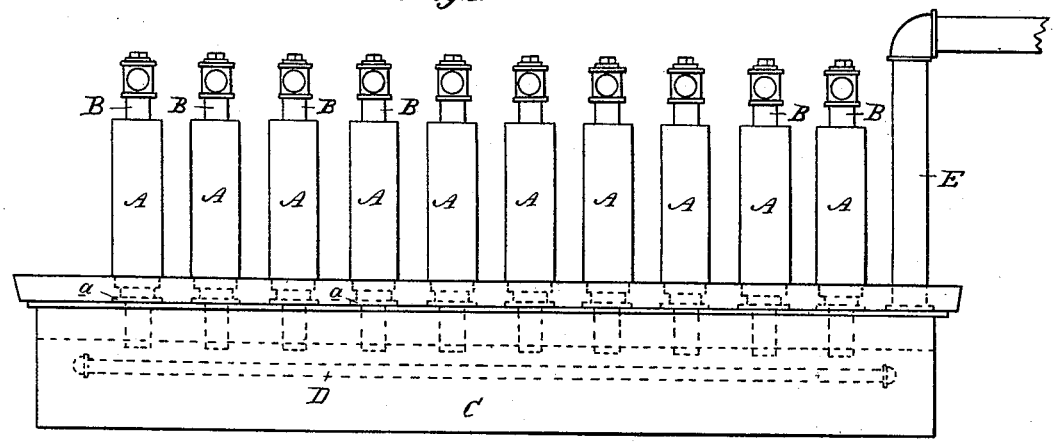
Fig. 1
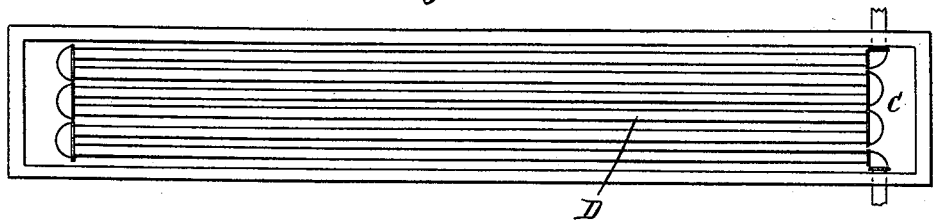
Fig. 2
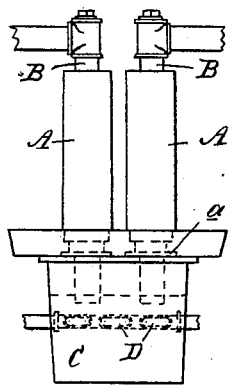
Fig. 3
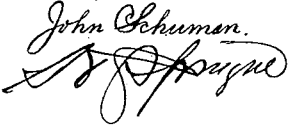
Attest:
John Schuman.
Inventor:
Deming Jarves.
by his Atty

UNITED STATES PATENT OFFICE.

DEMING JARVES, OF DETROIT, MICHIGAN.

APPARATUS FOR MAKING AMMONIA.

SPECIFICATION forming part of Letters Patent No. 344,184, dated June 22, 1886.

Application filed March 25, 1886. Serial No. 196,467. (No model.)

*To all whom it may concern:*

Be it known that I, DEMING JARVES, of Detroit, in the county of Wayne and State of Michigan, have invented new and useful Improvements in Plants for the Manufacture of Saturated Solutions of Ammonia; and I do hereby declare that the following is a full, clear, and exact description thereof, reference being had to the accompanying drawings, which form a part of this specification.

This invention relates to certain new and useful improvements in the construction and operation of a plant, or a portion thereof, to be employed with certain retorts of a character such as is described in Letters Patent No. 317,135, issued to me, and dated May 5, 1885, or such as are adapted to be used continuously in the manufacture of bone-black. In order to preserve the ammoniacal gases which are resultant from such manufacture, and convert them into a saturated solution of ammonia, it is required that such gases be conducted into suitable condensers or converters, in the passage through which the gases are so converted.

The object of this invention is to provide that part of the whole plant which is required to successfully convert such gases into such saturated solution of the best grade, so that the operation of the continuous retorts need not be interrupted to properly take care of the resultant gases.

The invention consists in the peculiar construction of the various parts, their combination and operation, as more fully hereinafter described and shown.

Figure 1 is a side elevation of my improved converter in battery. Fig. 2 is a plan view of the seal-box of the same. Fig. 3 is an end elevation of the apparatus.

In the drawings, A represents a series of cylindrical chambers set in single or double battery, as shown, and as the exigencies of the case may require. Projecting into and above the upper end of these chambers is a connecting-pipe, B, such pipes entering a seal in a manner well known, and which will allow the connecting-pipes to rise and fall under pressure or the heat of the gases without leaking. The lower ends of these chambers are contracted, as shown in dotted lines, and project through the top of the seal-box C, having suitable flanged supports, $a$, which rest upon the top of the seal-box, while the inwardly-projecting discharge ends of the chambers terminate below the water-line in said box, and in immediate proximity to the top of the water-pipe coil D. This latter has an inlet-connection through one side of the seal-box, and an outlet-connection on the opposite side of said box.

E is a discharge-pipe to lead off the non-condensable gases which flow into the seal-box with the ammoniacal gases. The tops of these chambers are suitably connected with the retorts wherein the destructive distillation is carried on in the manufacture of bone-black, and as these gases are very hot, to produce the best results it is necessary to keep the water in the seal-box at as low temperature as is possible. In order to do this, and also to prevent the generation of steam, by means of which a back-pressure would be had in the chambers, a current of cold water is kept constantly flowing through the coil, thereby keeping the temperature of the water in the seal-box sufficiently low for the production of the better results.

An overflow to carry off the saturated solution of ammonia from the seal-box is provided at any suitable and convenient point, and in any of the well-known ways of constructing such a device.

What I claim as my invention is—

1. In combination with a retort or battery of retorts, adapted to the purpose of destructive distillation, a chamber or battery of chambers connected with such retort or retorts by means of sealed connections in the top of such chamber or chambers, a seal-box, into which such chamber or chambers discharge, and a coil of pipe in such seal-box in near proximity with the discharge ends of such chambers, and having an inlet and an outlet connection through the walls of said box, substantially as and for the purposes described.

2. As a part of a plant for the production of a saturated solution of ammonia, the combination of the chamber A, seal-box C, pipe-coil D, and discharge-pipe E, the parts being constructed, arranged with relation to each other, and operating substantially as and for the purposes specified.

DEMING JARVES.

Witnesses:
H. S. SPRAGUE,
CHAS. THURMAN.